(12) United States Patent
Hisadomi

(10) Patent No.: US 6,724,565 B2
(45) Date of Patent: Apr. 20, 2004

(54) TAPE LOADING DEVICE HAVING AN ELASTIC MEMBER

(75) Inventor: Susumu Hisadomi, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 09/953,868

(22) Filed: Sep. 18, 2001

(65) Prior Publication Data

US 2002/0036861 A1 Mar. 28, 2002

(30) Foreign Application Priority Data

Sep. 25, 2000 (JP) ........................................ 2000-290922

(51) Int. Cl.$^7$ ................................................ G11B 5/027
(52) U.S. Cl. ...................................................... 360/85
(58) Field of Search ...................... 360/84–85; 242/346, 242/346.1, 346.2

(56) References Cited

U.S. PATENT DOCUMENTS 5,548,456 A * 8/1996 Jin ............................... 360/85

* cited by examiner

*Primary Examiner*—George J. Letscher
(74) *Attorney, Agent, or Firm*—Oblon, Spivak, McClelland, Maier & Neustadt, P.C.

(57) ABSTRACT

In a tape loading device, a loading drive gear rotates about a shaft. The loading drive gear includes a U-shaped groove in which the shaft is disposed and a spring accommodating portion disposed continuously to the U-shaped groove. The first and second arms are rotated by the rotation of the loading drive gear, whereby sliders are moved along guide openings so as to wind a tape around a drum. When the tape has been loaded, the sliders are stopped by catchers. When the loading drive gear is further rotated, the shaft thereof is moved to the spring accommodating portion, and an energizing force is generated to a spring and exerted on the first and second arms in a direction where the sliders are pressed against the catchers. With this operation, the positions of the sliders are fixed so that the tape can stably travel. Since the spring is contained in the loading drive gear, the number of parts can be reduced as well as the tape loading device can be arranged simply and assembled easily.

7 Claims, 6 Drawing Sheets

TAPE LOADING DEVICE HAVING AN ELASTIC MEMBER

This application claims benefit of Japanese Patent Application No. 2000-290922 filed in Japan on Sep. 25, 2000, the contents of which are incorporated by this reference.

BACKGROUND OF THE INVENTION

1. Field of the Invention

The present invention relates to a tape loading device for loading a tape in a magnetic recording/reproducing apparatus such as a video tape recorder and the like.

2. Description of the Related Art

VTRs (video tape recorders) sometimes employ a front loading system for substantially horizontally loading a tape cassette from the front surface of a cabinet. In the front loading system, when the tape cassette is inserted into a cassette holder from the front surface of the cabinet, the cassette holder moves to a tape loading device and loads it on the tape loading device. When the tape cassette is set at a predetermined position, the tape in the tape cassette is pulled out by the tape loading device.

In a helical scan system, the tape pulled out from the tape cassette is wound around a drum. That is, the tape loading device includes a pair of tape pull-out members (hereinafter, referred to as "sliders") that pass through the vicinity of an end of a drum from the vicinity of the tape cassette and move to the vicinity of the other end of the drum. The tape is pulled out by being hooked with the sliders and wound around the drum. With this operation, data can be recorded to and reproduced from the tape.

Each slider includes a guide roller rotatably mounted on a shaft having a flange, and an inclining post. As the sliders move, the tape is pulled out from the tape cassette while being in contact with the surfaces of the guide rollers and the inclining posts and travels by being guided by the guide rollers and the inclining posts.

FIGS. 1 and 2 are bottom plan views showing the back side of the chassis of a tape loading device as a related art of the above tape loading device.

A tape cassette (not shown) is transported by a cassette loading device (not shown) such that the tape take-out surface of the tape cassette is disposed at a position where it faces the peripheral surface of a drum (not shown).

A pair of guide openings 1 and 2 are formed through a chassis (not shown) from the vicinity of the position of a cassette holder at a time a tape cassette has been loaded to the vicinity of the front end of the drum through the vicinity of the rear end of the drum. The drum (not shown) is interposed between the guide openings 1 and 2. Sliders 3 and 4 for pulling out a tape are guided by the guide openings 1 and 2 and can slide from a position in the vicinity of the front end of the cassette holder to the rear end of the drum.

A guard panel on the front surface of the tape cassette opens in a process in which the tape cassette is inserted into a cabinet and loaded by the cassette loading device. On the completion of loading of the tape cassette, the guide rollers and the inclining posts of the sliders 3 and 4 are located inwardly of the tape in the tape cassette. When the tape cassette has been loaded, it is possible to pull out the tape from the tape cassette.

The sliders 3 and 4 move to the rear end of the drum along the guide openings 1 and 2 from the above state so as to pull out and load the tape. FIG. 1 shows a state in which the tape starts to be loaded.

Link mechanisms are mounted to ends of the sliders 3 and 4, and the rotation of a loading drive gear 7 is transmitted to the sliders 3 and 4 through the link mechanisms so that the sliders 3 and 4 are driven so as to slide along the guide openings 1 and 2.

That is, a pair of gears 5 and 6, which are meshed with each other, are rotatably disposed to the chassis between the guide openings 1 and 2. The gear 5 has a cut-out gear 14 disposed thereto coaxially, and a loading drive gear 7 is meshed with the cut-out gear 14. Thus, the gears 5 and 6 are rotated by the rotation of the loading drive gear 7.

The gears 5 and 6 have levers 8 and 9 fixed thereto and these levers 8 and 9 constitute link mechanisms, respectively. One ends of coupling members 10 and 11 are rotatably supported at the extreme ends of the levers 8 and 9 by means of shafts. The other ends of the coupling members 10 and 11 are rotatably supported by engaging portions 12 and 13 disposed at the rear ends of the sliders 3 and 4 by means of shafts.

The gears 5 and 6 are rotated in an opposite direction by the rotation of the loading drive gear 7, and the rotation of the gears 5 and 6 rotates the levers 8 and 9 about the rotational shafts of the gears 5 and 6. With this operation, the coupling members 10 and 11 connected to the extreme ends of the levers 8 and 9 are also moved, whereby the sliders 3 and 4 mounted at the extreme ends of the coupling members 10 and 11 are moved along the guide openings 1 and 2.

FIG. 2 shows a state before the completion of loading of the tape. The sliders 3 and 4 have locking portions 15 and 16 formed at the extreme ends thereof. The sliders 3 and 4 slide along the guide openings 1 and 2 until the locking portions 15 and 16 are abutted against catchers 17 and 18 fixed in the vicinity of the rear end of the drum disposed to the chassis. With this operation, when the tape has been loaded, the guide rollers and the inclining posts are located at predetermined stop positions in the vicinity of the rear end of the drum.

The positions of the sliders 3 and 4 must be fixed in a state in which the locking portions 15 and 16 thereof are abutted against the catchers 17 and 18 to permit the tape to stably travel while being wound around the drum. For this purpose, springs 19 are interposed between predetermined positions of the lever 8 and 9 and predetermined positions on the peripheries of the gears 5 and 6. The springs 19 energize the sliders 3 and 4 and move them in the directions of the catchers 17 and 18, that is, in a tape loading direction by further rotating and stopping the loading drive gear 7 after the locking portions 15 and 16 are abutted against the catchers 17 and 18. The energizing force of the springs 19 causes the catchers 17 and 18 to press the locking portions 15 and 16 so that the guide rollers are located at the positions regulated by the catchers 17 and 18.

The springs 19 must be provided to fix the guide rollers at the positions regulated by the catchers 17 and 18, which increases the number of parts, makes an assembly job such as a job for mounting the springs 19, and the like complicated and increases cost.

BRIEF SUMMARY OF THE INVENTION

An object of the present invention is to provide a tape loading device capable of reducing the number of parts, simplifying an arrangement and making it easy to assemble the device.

A tape loading device of the present invention includes a loading drive gear; a pair of tape guides; coupling members for coupling the loading drive gear with the pair of tape guides and moving the tape guides between a loading start position and a loading terminating position by the rotation of the loading drive gear; and a pair of loading stoppers for stopping the tape guides at the loading terminating position, wherein the loading drive gear has a shaft supported by an elastic member, is located at a center in an ordinary state and is decentered by a force in a predetermined direction against the elastic force of the elastic member, and the tape loading device further includes a unit disposed to the coupling members and the loading drive gear for exerting a force in the decentering direction on the loading drive gear by further rotating the loading drive gear after the pair of tape guides are abutted against the loading stoppers, thereby exerting the elastic force generated by the elastic member on the tape guides abutted against the loading stoppers through the coupling members.

A tape loading device of the present invention includes a rotatable loading drive gear; first and second arms rotated by the rotation of the loading drive gear; a pair of tape guides coupled with the first and second arms, respectively and moved by the rotation of the first and second arms, respectively; a pair of loading stoppers for stopping the movement of the pair of tape guides at predetermined positions when a tape has been loaded; a first unit for generating a force by decentering the loading drive gear; and a second unit for exerting, when the tape has been loaded, the force generated by the first unit by decentering the loading drive gear on the first and second arms so as to press the pair of tape guides against the pair of loading stoppers.

Further, a tape loading device of the present invention includes a rotatable loading drive gear; first and second arms rotated by the rotation of the loading drive gear; a pair of tape guides moved by the rotation of the first and second arms, respectively; a pair of loading stoppers for stopping the movement of the pair of tape guides at predetermined positions when a tape has been loaded; a first unit for generating a force by decentering the loading drive gear; and a second unit for abutting the first and second arms against the loading drive gear by rotating the first and second arms to the loading terminating position to thereby decenter the loading drive gear, whereby exerting the force generated by the first unit on the first and second arms so as to press the pair of tape guides against the pair of loading stoppers.

The other features and advantages of the present invention will be apparent from the following description.

DETAILED DESCRIPTION OF THE INVENTION

Figure 1:
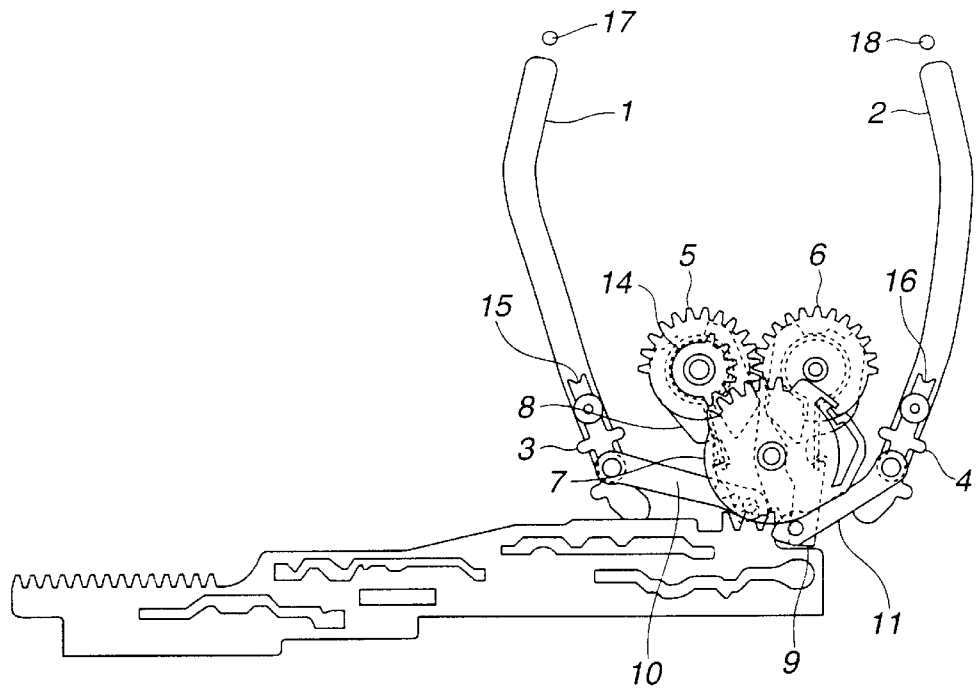
FIG. 1 is a bottom plan view showing a related art of a tape loading device.
Figure 2:
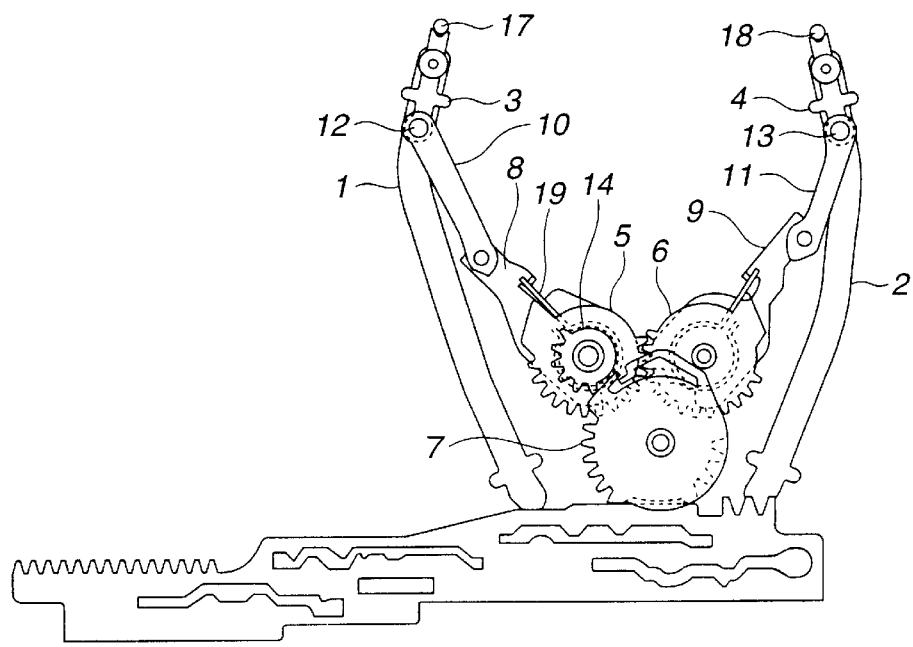
FIG. 2 is a bottom plan view showing the related art of the tape loading device.
Figure 3:
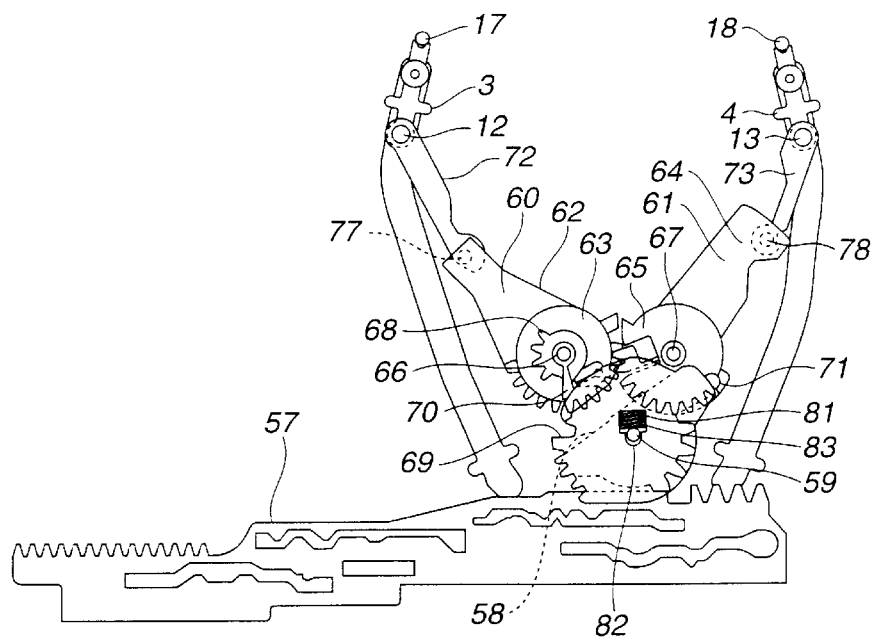
FIG. 3 is a bottom plan view showing an embodiment of a tape loading device according to the present invention.
Figure 4:
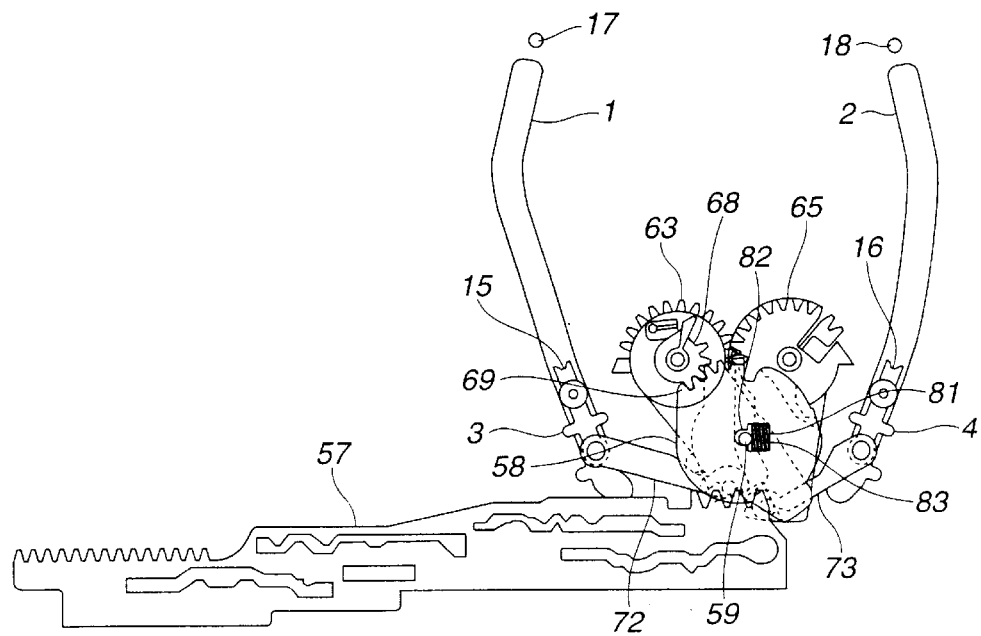
FIG. 4 is a bottom plan view showing the embodiment of the tape loading device according to the present invention.
Figure 5:
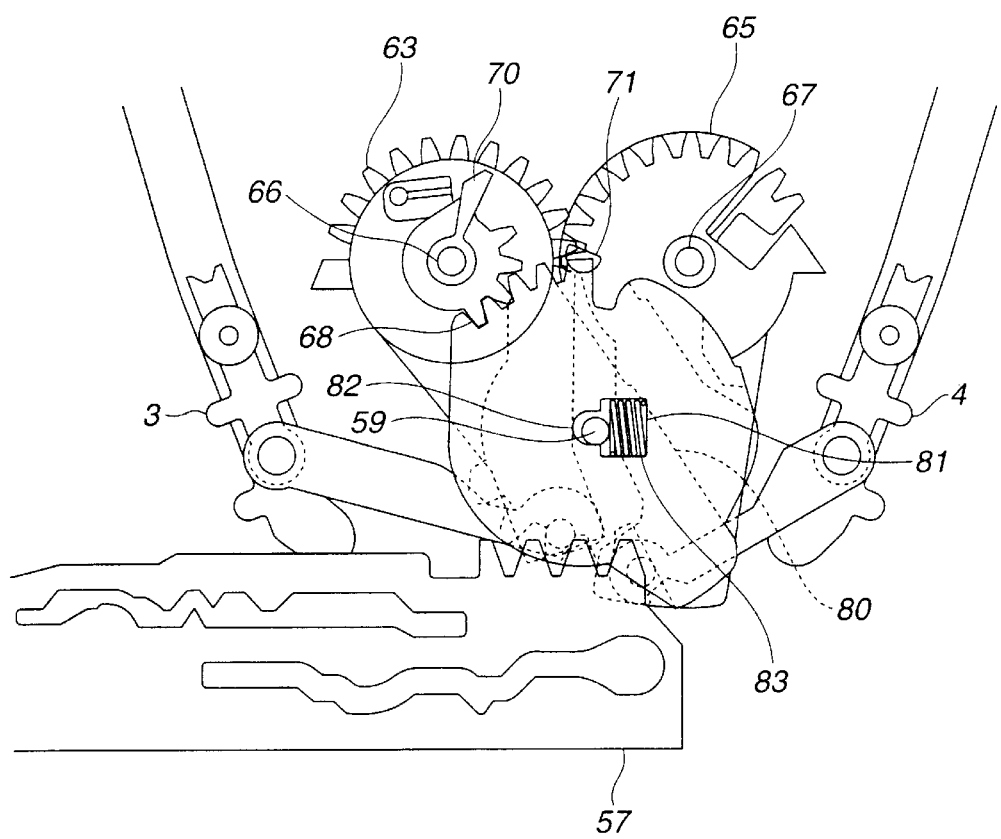
FIG. 5 is an enlarged view explaining the vicinity of a loading drive gear in the state shown in FIG. 4.
Figure 6:
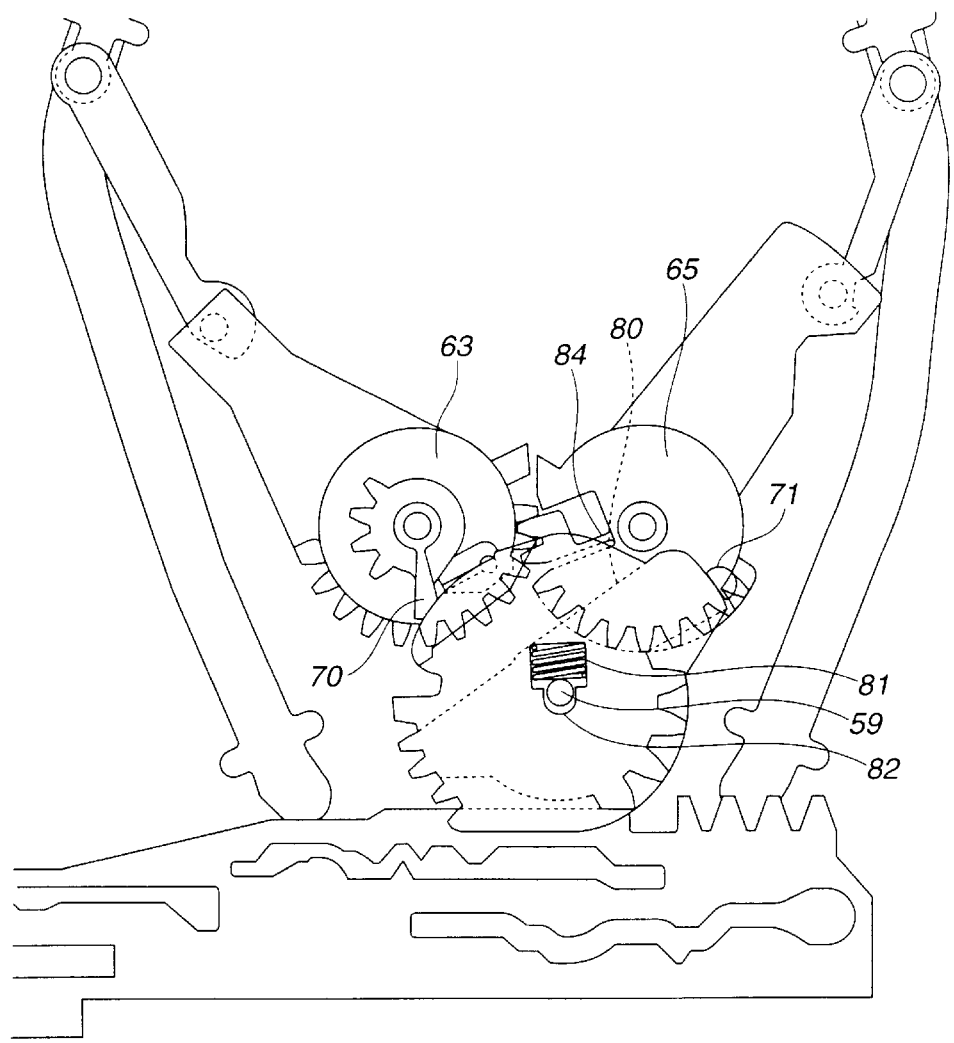
FIG. 6 is an enlarged view explaining the vicinity of the loading drive gear in the state shown in FIG. 3.
Figure 7:
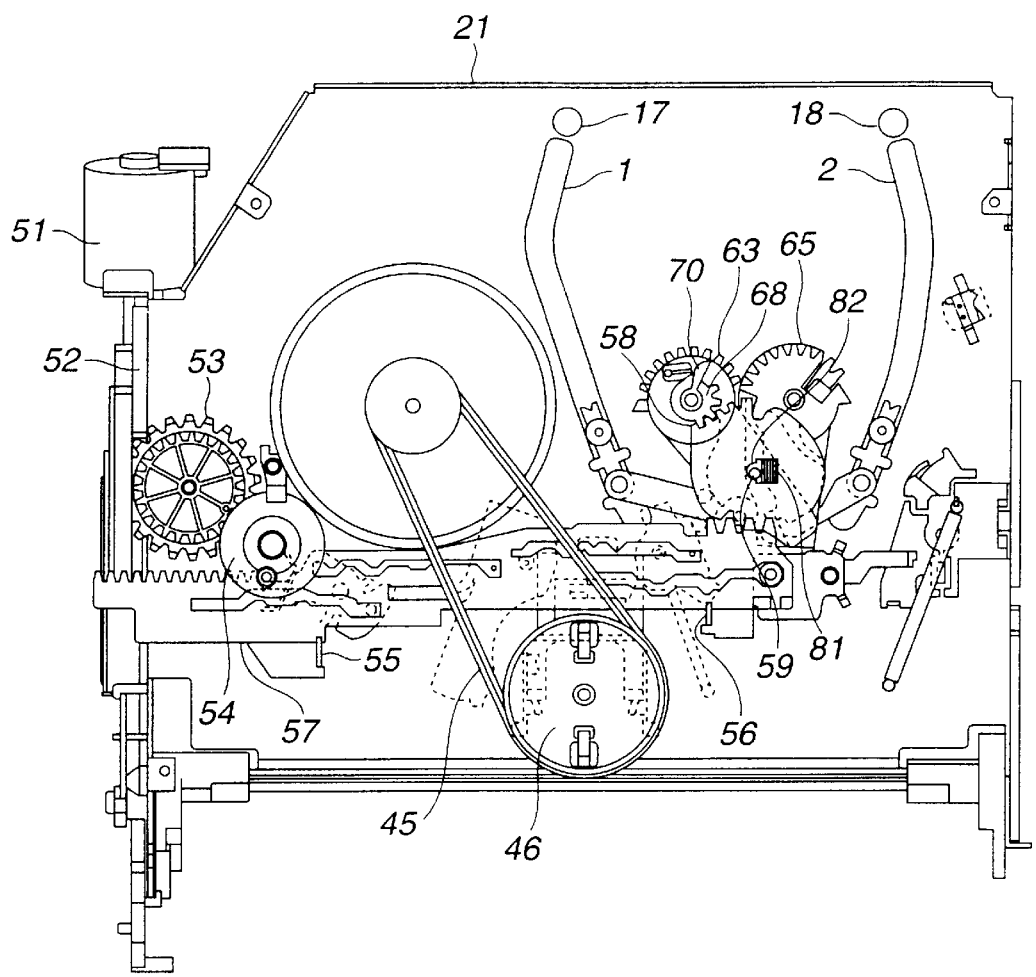
FIG. 7 is a bottom plan-view of a magnetic recording/reproducing apparatus to which the tape loading device shown in FIGS. 3 and 4 is assembled.

An embodiment of the present invention will be described below in detail with reference to the drawings. FIGS. 3 and 4 are bottom plan views showing an embodiment of a tape loading device according to the present invention; FIGS. 5 and 6 are enlarged views explaining the vicinity of a loading drive gear in the states shown in FIGS. 4 and 3; FIG. 7 is a bottom plan view of a magnetic recording/reproducing apparatus to which the tape loading device shown in FIGS. 3 and 4 is assembled; and FIG. 8 is a plan view of the magnetic recording/reproducing apparatus shown in FIG. 7.

Figure 8:
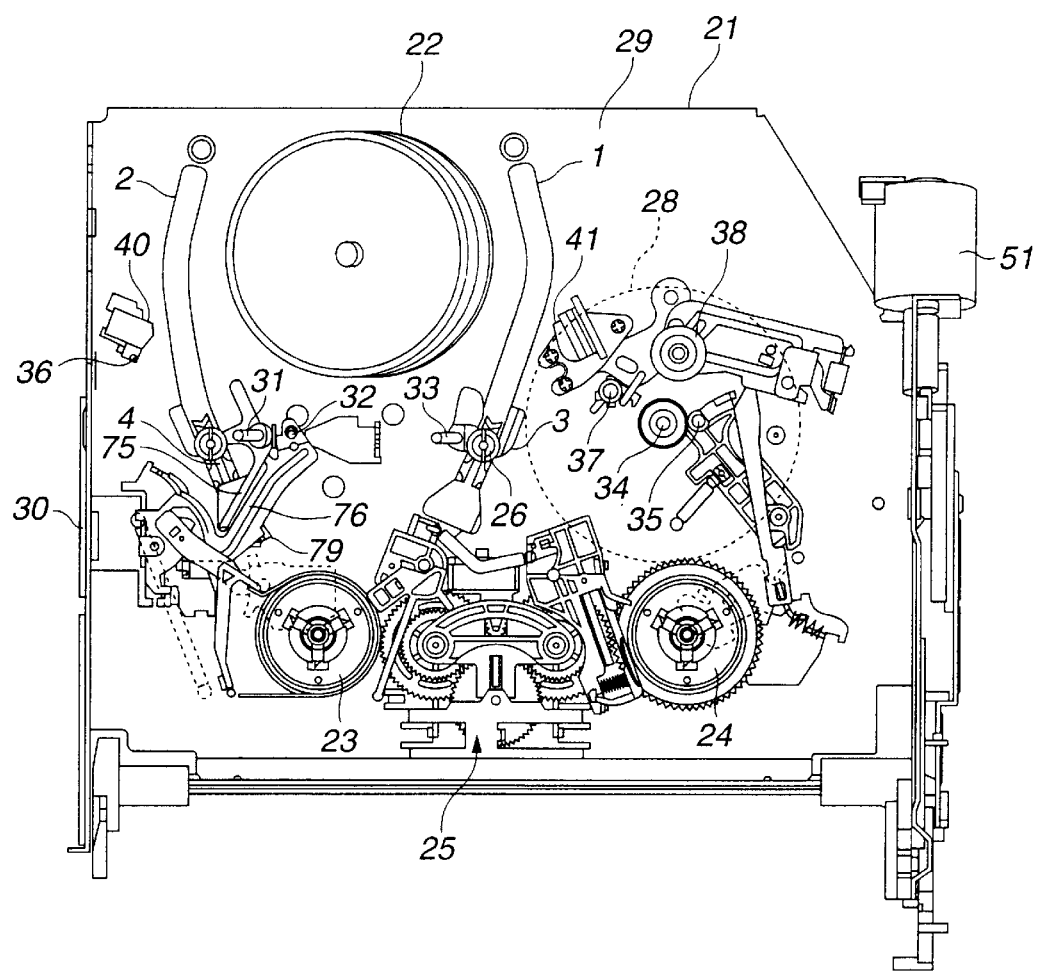
FIG. 8 is a plan view of the magnetic recording/reproducing apparatus shown in FIG. 7.

In FIGS. 7 and 8, a chassis 21 includes a base 29 and both sides (guide plates) 30. A drum 22 is disposed on the base 29. The drum 22 is composed of a fixed portion and a rotatable potion. The fixed portion is mounted on the chassis 21 with a predetermined inclining angle with respect thereto and rotatably supports the rotatable portion.

A supply hub (not shown) and a rewind hub (not shown) are disposed in a tape cassette (not shown). A tape is wound around these hubs and accommodated in the tape cassette. A supply reel mount 23 and a rewind reel mount 24 are rotatably mounted on shafts implanted in the base 29. When the tape cassette is loaded, the supply hub and the rewind hub of the tape cassette are engaged with the supply reel mount 23 and the rewind reel mount 24, respectively. The rotation of a capstan motor 28 is transmitted to the supply reel mount 23 and the rewind reel mount 24 through a gear box 25 so that they are driven according to an operation mode.

When the tape cassette has been loaded by a cassette loading mechanism which will be described later, it is disposed at a position where the tape take-out surface thereof faces the peripheral surface of the drum 22. A pair of guide openings 1 and 2 are formed through the base 29 from the vicinity of the position of a cassette holder at a time the tape cassette has been loaded to the vicinity of the rear end the drum 22 through the vicinity of the front end of the drum 22. The guide openings 1 and 2 guide the movement of sliders 3 and 4 acting as tape pull-out members. The sliders 3 and 4 are driven by a drive mechanism to be described later and can slide by being guided by the guide openings 1 and 2 from the base end positions of the guide openings 1 and 2 in the vicinity of the front end of the cassette holder to the terminal end positions of the guide openings 1 and 2 in the vicinity of the rear end of the drum 22.

The slider 3 includes a shaft provided with a flange, a rotatable guide roller 26 mounted on the shaft, and an inclining post 33 mounted on the slider 3. Similarly, the slider 4 includes a shaft provided with a flange, a rotatable guide roller 27 mounted on the shaft, and an inclining post 31 mounted on the slider 4. In a process in which the tape cassette is inserted into a cabinet and moved by a front loading mechanism, the guard panel of the tape cassette opens. On the completion of loading of the tape cassette, the sliders 3 and 4 are located on the side of the back surface (surface opposite to a magnetic recording surface) of the tape in a cassette half.

When the tape cassette has been loaded, the supply hub and the rewind hub can rotate freely, which permits the tape to be pulled out from the tape cassette. Note that the loading of the tape is completed by that the guide rollers 26 and 27 and the inclining posts 33 and 31 of the sliders 3 and 4 move from the positions where they are butted against the peripheral surface at the rear end of the tape in the cassette half to the rear end of the drum 22 along the guide openings 1 and 2. With this operation, the tape is pulled out from the tape cassette and wound around the drum 22.

When the tape has been loaded, the tape is guided such that it passes through the guide roller 27, the direction thereof is changed by the inclining post 31, it comes into contact with the side of the drum 22 in the range of about 180°, the direction thereof is changed to an original direction by the inclining post 33 and it travels to the guide roller 26.

To describe this operation in more detail, various types of poles for regulating the traveling path of the tape and various types of heads for magnetically recording and reproducing data on and from the tape, and the like are disposed on the traveling path. A tension pole 32, a capstan 34, and a guide pole 35 are disposed so as to face the back surface of the tape stretched between the supply hub and the rewind hub in the tape cassette when the tape cassette has been loaded. The tension pole 32 and the guide pole 35 move according to an operating state of a tape travel driving system including the loading of the tape so as to control the travel of the tape. Further, the capstan 34 is driven by the capstan motor 28 and causes the tape to travel while clamping the tape between it and a pinch roller 38.

An entire width erasing head 40 and a guide pole 36 are disposed on a side of the guide opening 2, whereas an ACE head 41 and a guide pole 37 are disposed on a side of the guide opening 1. The ACE head 41 forms an audio track and a control track. Accordingly, when the tape has been loaded, it is pulled out from the supply hub of the tape cassette, wound around the peripheral surface of the drum 22 through the guide pole 36, the entire width erasing head 40, the guide roller 27, and the supply side inclining post 31. Further, the tape is rewound by the rewind hub through the rewinding side inclining post 33, the guide roller 26, the ACE head 41, the guide pole 37, the capstan 34, and the guide pole 35.

The tension pole 32 moves to the vicinity of the guide pole 36 while the slider 4 is moving and is abutted against the back surface of the tape so as to adjust the tension thereof. Further, when the tape has been loaded, the pinch roller 38 moves to the side of the capstan 34 so that the peripheral surface thereof can cause the tape to come into contact with the peripheral surface of the capstan 34 under pressure.

The pinch roller 38 is arranged to rotate freely, and when the capstan 34 is rotated by the rotation of the capstan motor 28, the pinch roller 38 is rotated with the tape disposed therearound, whereby the tape can be transported. As shown in FIG. 7, the rotation of the capstan motor 28 also is transmitted to a pulley clutch 46 through a belt 45. The pulley clutch 46 transmits the rotational force of the capstan motor 28 to the supply reel mount 23 or the rewind reel mount 24 through the gear box 25 according to an operation mode so that the tape, which travels while being clamped between the capstan 34 and the pinch roller 38 by any of the hubs of the tape cassette.

The tape is loaded through the use of the rotational force generated by a loading motor 51 disposed on a side of the chassis 21. A rotatable worm wheel 52 is disposed on the side of the chassis 21, whereas a joint gear 53, which is meshed with the worm wheel 52, is rotatably disposed on the back surface of the base 29. Further, a cam switch drive gear 54, which is meshed with the worm wheel 52, is rotatably disposed on the back surface of the base 29. The rotational force of the loading motor 51 is transmitted to the cam switch drive gear 54 through the worm wheel 52 and the joint gear 53.

A slider cam 57 is slidably mounted on hooks 55 and 56 disposed on the back surface of the base 29. The slider cam 57 is a plate-shaped member having shapes according to modes and meshed with the cam switch drive gear 54 through the linear teeth disposed on one end thereof. The slider cam 57 is driven to move to a horizontal position according to the rotation of the cam switch drive gear 54.

A loading drive gear 58, which is rotatable about the vicinity of a shaft 59 implanted into the base 29, is interposed between the base ends of the guide openings 1 and 2. The loading drive gear 58 is meshed with a rack formed linearly at the other end of the slider cam 57 and rotates according to the linear movement of the slider cam 57. First and second arms 60 and 61 are interposed between the guide openings 1 and 2 at positions opposite to the portion where the loading drive gear 58 is meshed with the slider cam 57.

The first and second arms 60 and 61 are disposed so as to be rotated by shafts 66 and 67 implanted in the base 29. The first arm 60 includes a gear section 63 the teeth of which are formed on a part of a circular plate and an arm section 62 formed integrally with the gear section 63. The second arm 61 includes a gear section 65 the teeth of which are formed on a part of a circular plate and an arm section 64 formed integrally with the gear section 65. The gear sections 63 and 65 are meshed with each other and rotated in an opposite direction.

A cutout gear 68 is formed on the surface of the gear section 63 integrally and coaxially therewith. The cutout gear 68 is meshed with the teeth 69 formed to the loading drive gear 58 on a part of the outer periphery thereof. The rotation of the loading drive gear 58 rotates the gear section 63 and also the gear section 65.

A projection 70 is formed at the terminal end of the teeth section of the cutout gear 68. Further, a projection 71 is formed at an end on the surface of the gear section 65.

The positions, the shapes, and the like of the teeth of the cutout gear 68, which are meshed with the loading drive gear 58, and the projection 70 are regulated according to the range of rotation of the loading drive gear 58 corresponding to the horizontal movement of the slider cam 57. As will be described later, at the rotation terminating position of the loading drive gear 58 when the tape has been loaded, the peripheral surface of the loading drive gear 58 presses the extreme end of the projection 70 so as to rotate the cutout gear 68 in the same direction as that while the tape is being loaded. Further, at the rotation terminating position of the loading drive gear 58 when the tape has been loaded, the peripheral surface of the loading drive gear 58 presses a side of the projection 71 so as to rotate the gear section 65 in the same direction as that while the tape is being loaded.

One ends of coupling members 72 and 73 are rotatably supported at the extreme ends of the arm sections 62 and 64 by means of shafts 77 and 78. The other ends of the coupling members 72 and 73 are rotatably supported by engaging portions 12 and 13 disposed at the rear ends of the sliders 3 and 4 by means of shafts.

So called unloading of tape for returning the tape wound around the drum to a loading start position is executed by moving the slider cam 57 in a reverse direction by reversely rotating the loading motor 51 so as to reversely rotate the loading drive gear 58 and moving the sliders 3 and 4 to the base ends of the guide openings 1 and 2 through the arm sections 62 and 64 and the coupling members 72 and 73 by reversely rotating the gear sections 63 and 65.

At the rotation terminating position of the loading drive gear 58 when the tape has been unloaded, the extreme ends, which are located on the sides of the shafts 77 and 78, of the arm sections 62 and 64 of the first and second arms 60 and 61 are located in the vicinities of the base ends of the guide openings 1 and 2, and the sliders 3 and 4 are stopped on the sides of the base ends of the guide openings 1 and 2.

Note that a stop member 75, which projects toward the surface of the base 29, is formed to the slider 4 integrally therewith. When the sliders 3 and 4 are located on the sides of the base ends of the guide openings 1 and 2, the stop member 75 is abutted against a tension arm 76. An unloading stopper 79 projects from the surface of the base 29, and the tension arm 76 is prevented from moving in the unloading direction of the slider 4 by the unloading stopper 79. That is, the positions of the guide rollers, the tape guides, and the like are regulated by stopping the slider 4 in a state in which the stop member 75 is abutted against the tension arm 76 and the unloading stopper 79.

In this embodiment, a spring 81, a U-shaped groove 82, and the like are disposed as a means for fixing the positions of the sliders 3 and 4 when the tape has been loaded and when the tape is unloaded. The loading drive gear 58 has the U-shaped groove 82 formed at the center thereof to receive the shaft 59. One end of the U-shaped groove 82 is formed in an arc shape according to the shape of the shaft 59, and an accommodating section 83 is formed to the other end of the U-shaped groove 82 to accommodate the spring 81.

The spring 81 is a compressed spring which extends and contracts in a normal direction. When the spring 81 is not compressed, the length thereof in its extending/contracting direction is set approximately equal to the distance between the shaft 59 and the surface of the accommodating section 83 facing the shaft 59 in a state in which the shaft 59 is abutted against the arc-shaped portion of the U-shaped groove 82. In this embodiment, the peripheral surface of the loading drive gear 58 is not formed in a regular circle. Further, the energizing force of the spring 81 is transmitted to the arms 60 and 61 just before the completion of loading of the tape, depending upon how the shape of the projection 70 of the cutout gear 68 and the position of the projection 71 disposed to the gear section 65 are set.

That is, as shown in FIG. 5, a groove 80 having a shape corresponding to the locus of the projection 71 is formed to the loading drive gear 58. When the loading drive gear 58 and the gear section 65 rotate, the projection 71 passes through the groove 80 and is not abutted against the surface of the loading drive gear 58.

Just before the completion of loading, the projection 71 passes through the groove 80 and is abutted against the peripheral surface of the loading drive gear 58 as shown in FIG. 6. Further, at this time, the projection 70 also is abutted against the peripheral surface of the loading drive gear 58. As shown in FIG. 6, when the projections 70 and 71 are abutted against the peripheral surface of the loading drive gear 58, the loading drive gear 58 is decentered by being pushed by the projections 70 and 71 and the U-shaped groove 82 is separated from the peripheral surface of the U-shaped groove 82 depending upon the shape of the peripheral surface of the loading drive gear 58.

That is, while the tape is being loaded, the loading drive gear 58 rotates such that the U-shaped groove 82 thereof is substantially in sliding contact with the peripheral surface of the shaft 59. Then, just before the completion of loading, the peripheral surface of the loading drive gear 58 is pressed by a side of the projection 70, and the shaft 59 is separated from the peripheral surface of the U-shaped groove 82 toward the accommodating section 83. Accordingly, in this state, the spring 81 is pressed between the shaft 59 and the surface of the accommodating section 83, and the energizing force of the spring 81 is generated in the direction from the shaft 59 to the surface of the accommodating section 83. That is, the projection 70 receives a force from the energizing force of the spring 81 in a direction where it is pressed by the peripheral surface of the loading drive gear 58.

The extreme end of the projection 70 is disposed on the left side of the paper with respect to the line connecting the centers of the rotation of the loading drive gear 58 and the cutout gear 68. Thus, just before the completion of loading, the projection 70 is pushed by the peripheral surface of the loading drive gear 58 and receives a force for rotating the gear section 63 (first arm 60) in a clockwise direction in FIG. 3.

Further, the projection 71 disposed to the gear section 65 is disposed on the right side of the paper with respect to the line connecting the centers of the rotation of the loading drive gear 58 and the cutout gear 68. Thus, just before the completion of loading, the projection 71 is pushed by the peripheral surface of the loading drive gear 58 and receives a force for rotating the gear section 65 in a counterclockwise direction in FIG. 3.

The portions of the projections 70 and 71, which come into contact with the peripheral surface of the loading drive gear 58, are formed in a plane state so that they can reliably receive the force from the peripheral surface of the loading drive gear 58 when the tape has been loaded.

Note that a thin wall thickness portion 84, which transmits a small amount of force, is formed to the gear portion of the gear section 65 engaged with the gear section 63, and an energizing force for the gear section 65 is determined by the spring 81.

Next, the operation of this embodiment arranged as mentioned above will be described.

When the tape is inserted into the cassette holder (not shown) and the cassette holder is pushed and transported to a predetermined position in a horizontal direction, the loading motor 51 starts rotation. The cassette holder is transported in a horizontal direction and a vertical direction by the rotation of the loading motor 51, and the tape cassette is fixed to the reel mounts 23 and 24 under pressure.

In a state in which the tape cassette is fixed to the reel mounts 23 and 24 under pressure, the guide roller 27, the inclining post 31 acting as a supply side tape guide pole 31, the tension pole 32, the rewinding side inclining post 33 acting as a rewinding side tape guide pole, the guide roller 26, the capstan 34, and the guide pole 35 face the back surface of the tape.

On the completion of fixing of the tape cassette under pressure, the rotation of the loading motor 51 is transmitted to the joint gear 53 through the worm wheel 52 and further transmitted to the cam switch drive gear 54. With this operation, the slider cam 57 starts movement in a horizontal direction. The tape guides and the like are moved and brake is applied to the reel mounts by the movement of the slider cam 57.

FIG. 4 shows a state at the time the tape starts to be loaded. When the slider cam 57 starts movement from the state shown in FIG. 4, the loading drive gear 58 starts rotation in a counterclockwise direction in FIG. 4 so as to rotate the cutout gear 68 and the gear section 63 in a clockwise direction and to rotate the gear section 65 in a counterclockwise direction. With this operation, the arm sections 62 and 64 also start rotation in a clockwise direction and a counterclockwise direction, respectively so as to move the sliders 3 and 4 at the extreme ends of the coupling members 72 and 73 mounted at the extreme ends of the arm sections 62 and 64 along the guide opening 1 and 2. Note that, at this time, the loading drive gear 58 rotates with the peripheral surface of the shaft 59 abutted against the arc-shaped portion of the U-shaped groove 82 thereof.

The guide rollers 26 and 27 and the inclining posts 31 and 33 are mounted on the sliders 3 and 4. Thus, as the sliders 3 and 4 move, the guide rollers 26 and 27 and the inclining posts 31 and 33 also move to the rear end side of the drum 22 along the guide openings 1 and 2. The tape is pulled out from the tape cassette while being abutted against the rear ends of the peripheral surfaces of the guide rollers 26 and 27 and the rear ends of the peripheral surfaces of the inclining posts 31 and 33.

When the slider cam 57 further moves so as to further rotate the loading drive gear 58 in the counterclockwise direction in FIG. 4, the sliders 3 and 4 move to the terminal end positions of the guide openings 1 and 2, and the locking portions 15 and 16 formed at the extreme ends of the sliders 3 and 4 are abutted against catchers 17 and 18. That is, the tape is pulled out to the rear end side of the drum 22 by the guide rollers 26 and 27 and the inclining posts 31 and 33 and wound around the peripheral surface of the drum 22.

Further movement of the slider cam 57 causes the loading drive gear 58 to further rotate in the counterclockwise direction in FIG. 4. Thus, the projection 70 formed to the first arm 60 and the peripheral surface of the loading drive gear 58 are pressed against each other as well as the projection 71 formed to the second arm 61 and the peripheral surface of the loading drive gear 58 are pressed against each other. Thus, the arc-shaped portion of the U-shaped groove 82 of the loading drive gear 58 is separated from the peripheral surface of the shaft 59, and the spring 81 presses the surface of the accommodating section 83 of the U-shaped groove 82 by being pressed by the shaft 59. That is, the energizing force of the spring 81 acts as a force for causing the peripheral surface of the loading drive gear 58 to press the sides of the projections 70 and 71. With this operation, the first arm 60 is energized to rotate in a clockwise direction in FIG. 3, whereas the second arm 61 is energized to rotate in a counterclockwise direction in FIG. 3. That is, the locking portions 15 and 16 of the sliders 3 and 4 are pressed against the catchers 17 and 18 by the energizing force of the spring 81.

Further counterclockwise rotation of the loading drive gear 58 results in the state shown in FIG. 3 in which the plane portions of the projections 70 and 71 are pressed by the peripheral surface of the loading drive gear 58, whereby loading of the tape is completed. In this state, the locking portions 15 and 16 of the sliders 3 and 4 are reliably pressed by the catchers 17 and 18, and the guide rollers 26 and 27 and the inclining posts 31 and 33 are reliably located at the positions regulated by the catchers 17 and 18.

When the tape is to be unloaded, the slider cam 57 is moved in a left direction of the paper in FIG. 3 by the rotation of the loading motor 51. With this operation, the loading drive gear 58 is rotated in the clockwise direction, the first arm 60 is rotated in the counterclockwise direction, and the second arm 61 is rotated in the clockwise direction in FIG. 3, respectively. Accordingly, the sliders 3 and 4 slide along the guide openings 1 and 2 in directions where they are separated from the catchers 17 and 18.

Just before the completion of unloading, the sliders 3 and 4 move to the sides of the base ends of the guide openings 1 and 2. Thus, the stop member 75 of the slider 4 is abutted against the tension arm 76 and further the tension arm 76 is abutted against unloading stopper 79, whereby the movement of the slider 4 in an unloading direction is stopped. Note that, at this time, the loading drive gear 58 is rotated in a state in which the peripheral surface of the shaft 59 is abutted against the arc-shaped portion of the U-shaped groove 82 of the loading drive gear 58.

When the slider cam 57 is further moved in the left direction of the paper in FIG. 3 in this state, the teeth of the slider cam 57 press the teeth disposed around the peripheral surface of the loading drive gear 58 in a left direction of the paper in FIG. 4. Since the loading drive gear 58 is meshed with the gear section 63, the loading drive gear 58 is slightly moved in the left direction of the paper in FIG. 4 by the movement of the slider cam 57. With this operation, the arc-shaped portion of the U-shaped groove 82 of the loading drive gear 58 is separated from the peripheral surface of the shaft 59, and the spring 81 presses the surface of the accommodating section 83 of the U-shaped groove 82 by being pressed by the shaft 59.

That is, the energizing force of the spring 81 causes the peripheral surface of the loading drive gear 58 to press the teeth of the cutout gear 68. Thus, a force for rotating the first arm 60 in the counterclockwise direction in FIG. 4 is generated. That is, the energizing force of the spring 81 causes the unloading stopper 79 to press the stop member 75 of the slider 4 through the tension arm 76. With this operation, the positions of the guide rollers, the tape guides and the like are fixed when the tape has been unloaded.

As described above, in the tape loading device of this embodiment, the number of parts can be reduced by the employment of the first and second arms having the gear sections and the arm sections as well as by the employment of the loading drive gear having the spring assembled thereto. The sliders are pressed against the catchers through the use of the energizing force of the spring in the loading drive gear to ensure the reliable positioning of the sliders. Since the spring is assembled previously, the tape loading device can be arranged and assembled easily.

Having described the preferred embodiment of the invention referring to the accompanying drawings, it should be understood that the present invention is not limited to the precise embodiment and various changes and modifications thereof could be made by one skilled in the art without departing from the spirit or scope of the invention as defined in the appended claims.

What is claimed is:

1. A tape loading device, comprising:

a loading drive gear;

a pair of tape guides;

coupling members for coupling said loading drive gear with said pair of tape guides and moving said tape guides between a loading start position and a loading terminating position by the rotation of said loading drive gear; and a pair of loading stoppers for stopping said tape guides at the loading terminating position, wherein said loading drive gear has a shaft supported by an elastic member, is located at a center in an ordinary state and is decentered by a force in a predetermined direction against the elastic force of said elastic member, and the tape loading device further comprising:

a unit disposed to said coupling members and said loading drive gear for exerting a force in the decentering direction on said loading drive gear by further rotating said loading drive gear after said pair of tape guides are abutted against said loading stoppers, thereby exerting the elastic force generated by said elastic member on said tape guides abutted against said loading stoppers through said coupling members.

2. A tape loading device, comprising:

a rotatable loading drive gear;

first and second arms rotated by the rotation of said loading drive gear;

a pair of tape guides coupled with said first and second arms, respectively and moved by the rotation of said first and second arms, respectively;

a pair of loading stoppers for stopping the movement of said pair of tape guides at predetermined positions when a tape has been loaded;

a first unit for generating a force by moving a center of said loading drive gear; and a second unit for exerting, when the tape has been loaded, the force generated by said first unit by moving the center of said loading drive gear by being pushed by a projection and on said first and second arms so as to press said pair of tape guides against said pair of loading stoppers.

3. A tape loading device according to claim 2, wherein said second unit comprises a projection formed to at least one of said loading drive gear, said first arm, and said second arm, and when said first and second arms rotate to the state in which the tape has been loaded, the center of said loading drive gear is moved by abutting said first and second arms against said loading drive gear through said projection.

4. A tape loading device according to claim 2, wherein said first unit comprises:

a shaft abutting portion formed at the center of said loading drive gear and an accommodating portion for receiving the force;

a fixed shaft located at said shaft abutting portion for supporting the rotation of said loading drive gear; and a spring member disposed so as to generate no action force between said fixed shaft and at least one of said first and second arms when said fixed shaft is abutted against said shaft abutting portion and to generate an action force between said fixed shaft and at least one of said first and second arms when said fixed shaft is separated from said shaft abutting portion.

5. A tape loading device according to claim 4, wherein the center of said loading drive gear is moved by abutting said first and second arms against said loading drive gear at the position where said pair of tape guides are pressed against said pair of loading stoppers, thereby separating said fixed shaft from said shaft abutting portion.

6. A tape loading device according to claim 4, further comprising:

an unloading stopper for stopping the movement of said pair of tape guides at predetermined positions when the tape has been unloaded, wherein said second unit causes said first unit to generate a force by separating said fixed shaft from said shaft abutting portion by moving the center of said loading drive gear when the tape has been unloaded as well as exerts the force generated by said first unit on said first arm so as to press at least one of said pair of tape guides against said unloading stopper.

7. A tape loading device, comprising:

a rotatable loading drive gear;

first and second arms rotated by the rotation of said loading drive gear;

a pair of tape guides moved by the rotation of said first and second arms, respectively;

a pair of loading stoppers for stopping the movement of said pair of tape guides at predetermined positions when a tape has been loaded;

a first unit for generating a force by moving a center of said loading drive gear; and a second unit for abutting said first and second arms against said loading drive gear by rotating said first and second arms to the loading terminating position to thereby move the center of said loading drive gear by being pushed by a projection and, whereby exerting the force generated by said first unit on said first and second arms so as press said pair of tape guides against said pair of loading stoppers.

* * * * *